US00RE35473E

United States Patent [19]

Oakley et al.

[11] E Patent Number: Re. 35,473

[45] Reissued Date of Patent: Mar. 11, 1997

[54] SLUDGE FLOW MEASURING SYSTEM

[75] Inventors: Edward A. Oakley, South Salem, N.Y.; Harry K. Crow, Ridgefield, Conn.; Thomas M. Anderson, Forest Lake; Richard T. Atherton, Excelsior, both of Minn.; Berthold A. Fehn, Krefeld, Germany

[73] Assignee: Schwing America, Inc., White Bear, Minn.

[21] Appl. No.: 392,533

[22] Filed: Feb. 23, 1995

Related U.S. Patent Documents

Reissue of:

[64] Patent No.: 5,106,272
Issued: Apr. 21, 1992
Appl. No.: 595,457
Filed: Oct. 10, 1990

[51] Int. Cl.[6] ..... F04B 35/02

[52] U.S. Cl. ..... 417/347; 417/63; 417/900; 417/53; 73/239

[58] Field of Search ..... 417/63, 342, 347, 417/900, 317, 53; 73/239, 3

[56] References Cited

U.S. PATENT DOCUMENTS

| | | | |
|---|---|---|---|
| 3,650,638 | 3/1972 | Cole | 417/346 |
| 4,543,044 | 9/1985 | Simmons | 417/342 |
| 4,781,066 | 11/1988 | Pope et al. | 73/239 |
| 4,790,728 | 12/1988 | Dwyer et al. | 417/342 |

*Primary Examiner*—Charles G. Freay
*Attorney, Agent, or Firm*—Kinney & Lange

[57] ABSTRACT

A system for the transport of high solids sludge includes a positive displacement pump for pumping sludge through a pipeline. The volume of sludge transported is accurately measured by determining the fill percentage by using a material flow signal, measured time intervals, hydraulic fluid pressure, or hydraulic fluid flow rate during each pumping cycle.

34 Claims, 7 Drawing Sheets

SLUDGE FLOW MEASURING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to systems for transporting high solids sludge. In particular, the present invention relates to a sludge transport system in which a positive displacement pump conveys sludge through a pipeline, and in which pumping rate and accumulated volume of material pumped are automatically determined.

In recent years, sludge pumps have found increasing use for conveying sludge through a pipeline in municipal and industrial applications. Sludge pumps offer a number of significant advantages over screw or belt conveyers. Pumping sludge through a pipeline contains odors for a safe and secure working environment. Sludge pumps are capable of pumping thick, heavy sludges which may not be practical for belt or screw conveyers. This is particularly important where the sludges are to be dried and burned in an incinerator. A pipeline experiences little or no wear and maintenance is very low compared to a screw or belt conveyer. A pump and pipeline take up less space, and are capable of transporting material around corners with simple elbows. Sludge pumps also offer reduction in noise over mechanical conveyers, and generally offer greater cleanliness and no spillage.

Various state and federal regulations covering the processing and disposal of sludges require that the processor accurately measure and record the amount of material handled. Although there are various methods of transporting sludges with high solids content, none of the systems presently being used has offered the desired accuracy in measurement of material handled.

SUMMARY OF THE INVENTION

The present invention is based upon the recognition that a positive displacement pump, together with a system which determines the percent fill of the pump cylinder(s) during each pumping stroke, offers the combined capability of effective transportation of high solid sludge, and the capability of accurate volume and flow rate measurement.

It is not normally possible to fill the cylinder or cylinders of a positive displacement pump to 100% of the known capacity. The sludge typically contains air and other compressible material. Therefore, a portion of each pumping stroke of the positive displacement pump involves simply compressing the sludge in the cylinder before the pressure of the piston overcomes the existing pressure at the outlet of the pump so the material begins to flow out of the cylinder and into the pipeline. In the present invention, at least one parameter related to the operation of the positive displacement pump is sensed in order to identify the point during the pumping stroke when the hydraulic pressure applied to the piston is sufficient to overcome outlet pressure (so that sludge material begins to be pumped out of the cylinder). From that information, the actual volume of material being pumped during that pumping stroke in determined. By accumulating the volume pumped during each stroke, an accumulated volume is determined. By dividing the actual volume pumped during a pumping cycle by the time period of the pumping cycle, an instantaneous pumping rate can be determined.

In one preferred embodiment of the present invention, the pump includes an outlet valve between the cylinder and the outlet which opens only when pressure within the cylinder essentially equals pressure at the outlet. The opening of the outlet valve is sensed, and the period of time from the opening of the outlet valve to the end of the pumping stroke is determined. The sensed time period is compared to the entire time from the start to the end of the pumping stroke. As a result, a fill percentage of the total volume of the cylinder is determined for each pumping stroke.

Another embodiment also uses a pump with an outlet valve which opens only when pressure within the cylinder essentially equals pressure at the outlet. A position sensor senses the position of the piston in the cylinder at the moment when the outlet valve opens. This provides an indication of the volume being pumped during that particular pumping stroke.

In other embodiments, the outlet valve of the pump is open during the entire pumping stroke, and the hydraulic pressure driving the piston is sensed. In one embodiment, the outlet pressure is also sensed, and either time or piston position in the pumping stroke when the hydraulic pressure equals the outlet pressure is determined. This can be used to derive a fill percentage or volume delivered using each pumping stroke.

In another embodiment, the hydraulic pressure waveform is analyzed to determine when sludge starts to be pumped out of the cylinder to the pipeline. By sensing either linear portion of the piston or the relative time at which slope equals zero compared to the start and stop of the pumping stroke, the percentage fill of the cylinder (and thus the volume delivered) during that pumping stroke can be determined.

With the present invention, accurate measurement of instantaneous pumping rate, accumulated volume pumped, and pump efficiency is possible. This allows the sludge transporting system of the present invention to be used in applications where very accurate monitoring of sludge disposal is required.

DETAILED DESCRIPTION OF THE PREFERRED EMBODIMENTS

Figure 1:
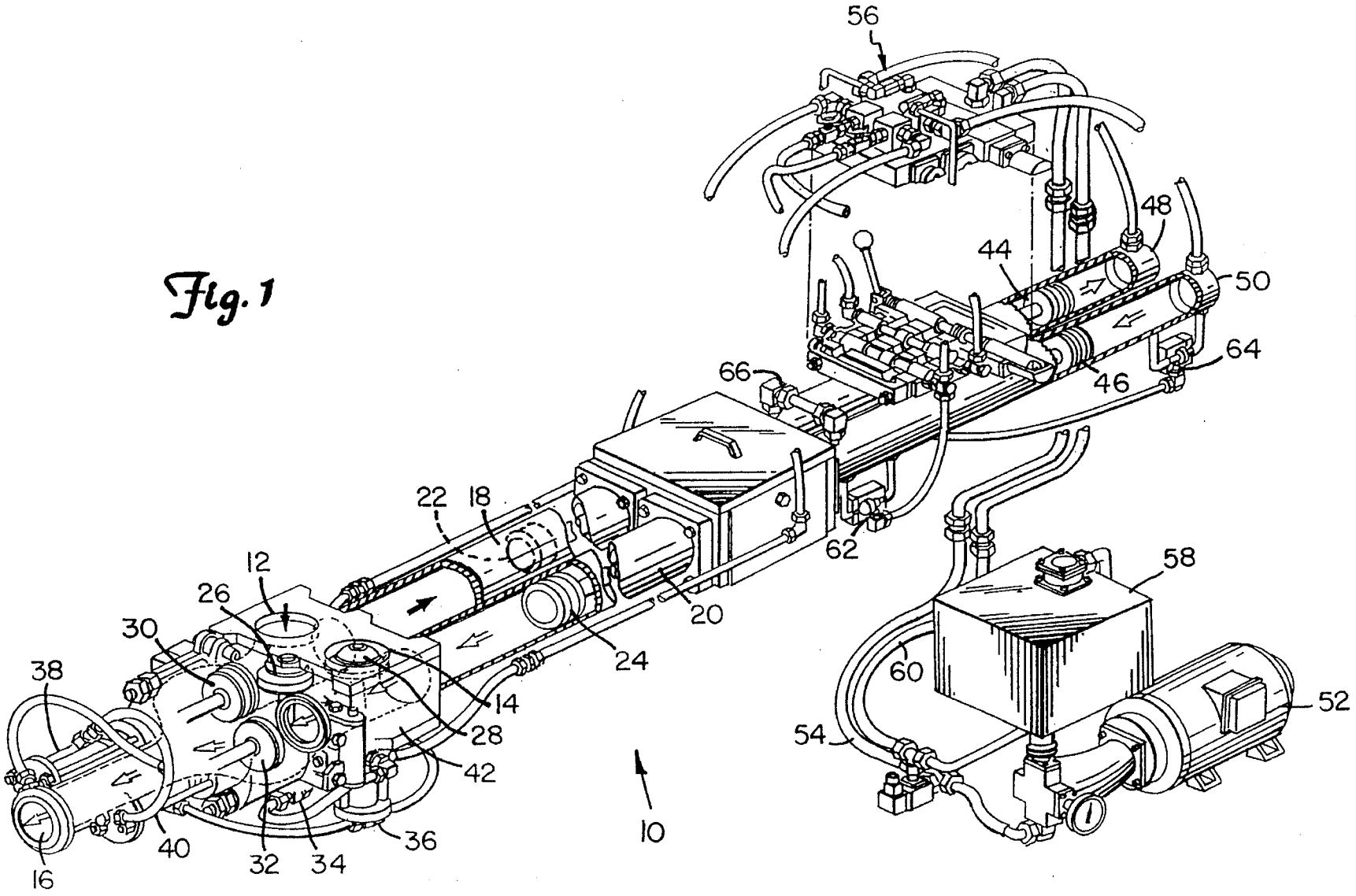
FIG. 1 is a perspective view, with portions broken away and portions exploded, of a sludge pump system which uses inlet and outlet poppet valves.

FIG. 1 shows a two cylinder hydraulically driven positive displacement sludge pump 10. High solids sludge material is received at inlets 12 and 14, and is pumped through outlet 16 to a pipeline (not shown). Pump 10 includes a pair of material cylinders 18 and 20 in which a pair of material pistons 22 and 24 reciprocate. Inlet poppet valve 26 controls the flow of sludge from inlet 12 to material cylinder 18. Similarly, inlet poppet valve 28 controls the flow of sludge from inlet 14 to material cylinder 20. The flow of sludge from cylinders 18 and 20 to outlet 16 is controlled by outlet poppet valves 30 and 32, respectively.

Inlet poppet valves 26 and 28 are controlled by hydraulic inlet valve cylinders 34 and 36, respectively. Outlet poppet valves 30 and 32 are controlled by hydraulic outlet valve cylinders 38 and 40.

In the particular position shown in FIG. 1, inlet poppet valve 26 and outlet poppet valve 32 are in an open position. This means that piston 22 is moving away from poppet valve housing 42, while material piston 24 is moving toward poppet valve housing 42. Sludge is being drawn through inlet 12 and into cylinder 18, while sludge is being pumped from cylinder 20 to outlet 16.

Material pistons 22 and 24 are coupled to hydraulic drive pistons 44 and 46, respectively, which move in hydraulic cylinders 48 and 50. Hydraulic fluid is pumped from hydraulic pump 52 through high pressure lines 54 to control valve assembly 56. Assembly 56 includes throttle and check valves which control the sequencing of high and low pressure hydraulic fluid to hydraulic cylinders 48 and 50 and to poppet valve cylinders 34, 36, 38 and 40. Low pressure hydraulic fluid returns to hydraulic reservoir 58 through low pressure line 60 from valve assembly 56.

Forward and rear switching valves 62 and 64 sense the position of piston 46 at the forward and rear ends of travel and are interconnected to control valve assembly 56. Each time piston 46 reaches the forward or rear end of its travel in cylinder 50, a valve sequence is initiated which results in closing of all four poppet valves and a reversal of the high pressure and low pressure connections to cylinders 48 and 50.

The sequence of operations of pump 10 is generally as follows. As the drive pistons 44 and 46 and their connected material pistons 22 and 24 come to the end of their stroke, one of the material cylinders (in FIG. 1, cylinder 20) is discharging material to outlet 16, while the other cylinder 18 is loading material from inlet 12. The end of the pumping stroke, material piston 24 is at its closest point to poppet valve housing 42, while piston 22 is at its position furthest from poppet valve housing 42. At this point, switching valve 62 senses that hydraulic drive piston 46 has reached the forward end of its stroke. Valve assembly 56 is activated which causes poppet valve cylinders 34 and 40 to be actuated. This causes inlet poppet valve 26 and outlet valve 32 to close.

At this point, pistons 22 and 24 are at the ends of their stroke, and their direction movement is about to reverse. All four poppet valves 26, 28, 30 and 32 are closed. Hydraulic pressure begins to increase in cylinder 48, which drives piston 44 forward. In turn, piston 22 moves forward toward poppet valve housing 42. Piston 22, therefore, is now in a pumping or discharging stroke. At the same time, hydraulic fluid located forward of piston 44 is being transferred from cylinder 48 through interconnection 66 to the forward end of cylinder 50. This applies hydraulic pressure to piston 46 to move it in a rearward direction. As a result, material piston 24 begins moving away from poppet valve housing 42 and it is in a loading or filling stroke. When the pressure in valve housing 42 below poppet valve 28 essentially equals the pressure on the inlet side, poppet valve 28 opens, which allows sludge to flow through inlet 14 and into cylinder 20 during the filling stroke.

As piston 22 begins to move forward, it first compresses the sludge within cylinder 22. At the moment when the compressed sludge equals the pressure of the compressed sludge in the delivery line and at outlet 16, poppet valve 30 opens. Since the poppet valve for the discharging cylinder opens only when the cylinder content pressure essentially equals the pressure in the pipeline, no material can flow back.

The operation continues, with piston 22 moving forward and piston 24 moving rearward until the pistons reach the end of their respective strokes. At that point, switching valve 64 causes valve assembly 56 to close all four poppet valves and reverse the connection of the high and low pressure fluid to cylinders 48 and 50.

The operation continues with one material piston 22, 24 operating in a filing stroke while the other is operating in a pumping or discharge stroke.

Figure 2:
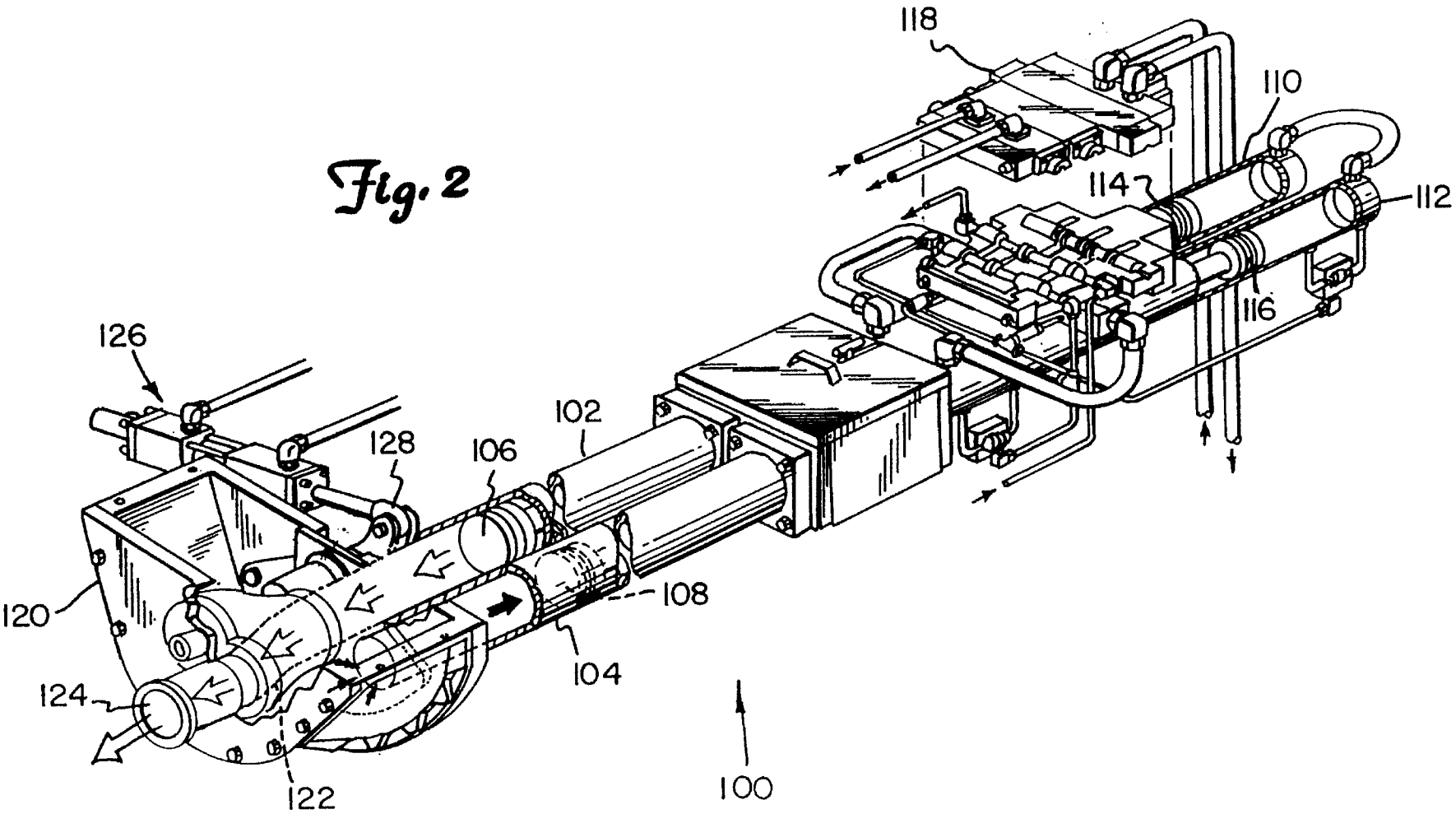
FIG. 2 is a perspective view, with portions broken away and portions exploded, of a portion of sludge pump having a pivoting transfer tube valve.

FIG. 2 shows a perspective view, with portions broken away, of a two cylinder positive displacement sludge pump 100 having a pivoting transfer tube valve, as opposed to the poppet valve arrangement shown in FIG. 1. Pump 100 includes a pair of material cylinders 102 and 104 in which material pistons 106 and 108 reciprocate. Hydraulic drive cylinders 110 and 112 have drive pistons 114 and 116, respectively, which are connected to material pistons 106 and 108, respectively. Valve assembly 118 controls the sequencing of movement of pistons 114 and 116, and thus the movement of pistons 106 and 108 in material cylinders 102 and 104.

Sludge is supplied to hopper 120, in which a pivoting transfer tube 122 is positioned. Transfer tube 122 connects outlet 124 with one of the two material cylinders (in FIG. 2 outlet 124 is connected to cylinder 102), while the inlet to the other material cylinder (in this case cylinder 104) is open to the interior of hopper 120. In FIG. 2, piston 106 is moving forward in a discharge stroke to pump sludge out of cylinder 102 to outlet 124, while piston 108 is moving rearward to draw sludge into cylinder 104.

At the end of a stroke, hydraulic actuators 126 which are connected to pivot arm 128 cause transfer tube 122 to swing so that outlet 124 is now connected to cylinder 104. The direction of movement of pistons 106 and 108 reverses, with piston 108 moving forward in a discharge stroke while piston 106 moves backward in a filling or loading stroke.

Hydraulic fluid to operate the cylinders and the controls of pump 100 is supplied by a hydraulic pump and reservoir assembly (not shown in FIG. 2) which is similar to pump 52 and reservoir 58 shown in FIG. 1.

A primary difference between pump 100 shown in FIG. 2 and pump 10 shown in FIG. 1 is the valve arrangement. In pump 100, one of the two cylinders 102 and 104 is connected to outlet 124 during the entire discharge or pumping stroke. In contrast, in pump 10, the outlet poppet valve 30, 32 opens only when material within the cylinder has compressed to the point at which the outlet pressure and the pressure of material within the material cylinder are equal. As discussed later, the system of the present invention can be used with either pump 10 or pump 100, with some difference in the parameters being sensed to accommodate the differences in operation of the two valve assemblies.

Figure 3:
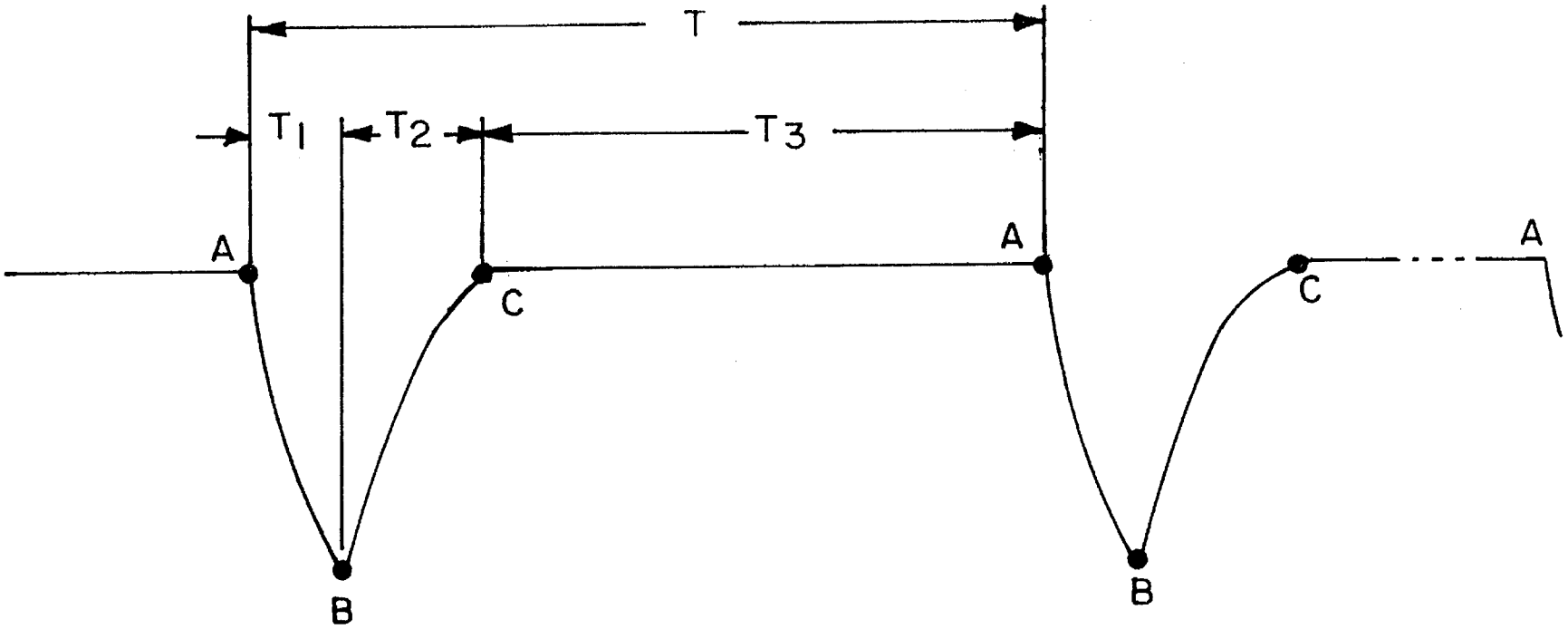
FIG. 3 is a graph of pressure as a function of time in a two cylinder sludge pump of the type shown in FIG. 1.

FIG. 3 is a graph of material pressure as a function of time in a two cylinder sludge pump of the type shown in FIG. 1. A pumping cycle starts at point A, at which one of the pistons is at its forwardmost position and the other piston is at its rearwardmost position. By point B, all four poppet valves 26, 28, 30 and 32 (FIG. 1) have closed, and the pistons start to move. At point C, the pressure of the sludge has reached the level of the pressure at outlet 16, so that the outlet poppet valve for that cylinder opens. From point C until point A of the following cycle there is continuous flow of material out of the cylinder to the outlet 16. Operation of a pump the type shown in FIG. 2 will produce a similar graph of material pressure versus time.

As shown in FIG. 3, the time T of an entire pumping cycle includes three time components. Time T1 is the time from the end of movement of the pistons until the pistons start moving again. Time T2 is the time from the beginning of movement of the piston until pressure has built to a point where the pressure of the sludge overcomes the outlet pressure so that the flow of material will be out of the cylinder to the outlet. Time T3 is the time during which material is being pumped out of the material cylinder to the outlet.

A single-cylinder pump will have a similar type of curve, except that there will be a time period during which the piston is moving rearward on fill stroke and no pumping stroke is taking place. In a two-cylinder pump of the type shown in FIG. 1 or FIG. 2, the respective material cylinders and pistons alternate filling and pumping cycles, so that there is always one cylinder and piston in a pumping stroke while the other is in a filling stroke.

By comparing times T2 and T3, it is possible to determine a percentage fill of material in a cylinder during a particular pumping cycle. The percentage fill is: T3/(T2+T3). This assumes, of course, that the piston is moving at an essentially constant velocity.

By knowing the percentage fill during one pumping cycle and the total displacement volume of the cylinders, the volume pumped during a particular cycle can be determined. By adding together the pumped volumes for multiple cycles, an accumulated volume can be determined.

Similarly, by dividing the accumulated volume by the time period over which that volume has been accumulated, an average pumping rate can be determined. An instantaneous pumping rate for each cycle can also be determined. By knowing the total time T of the cycle, the percentage fill, and the total volume when the cylinder is 100 percent filled, the instantaneous pumping rate for each individual cycle can be determined.

Figure 4:
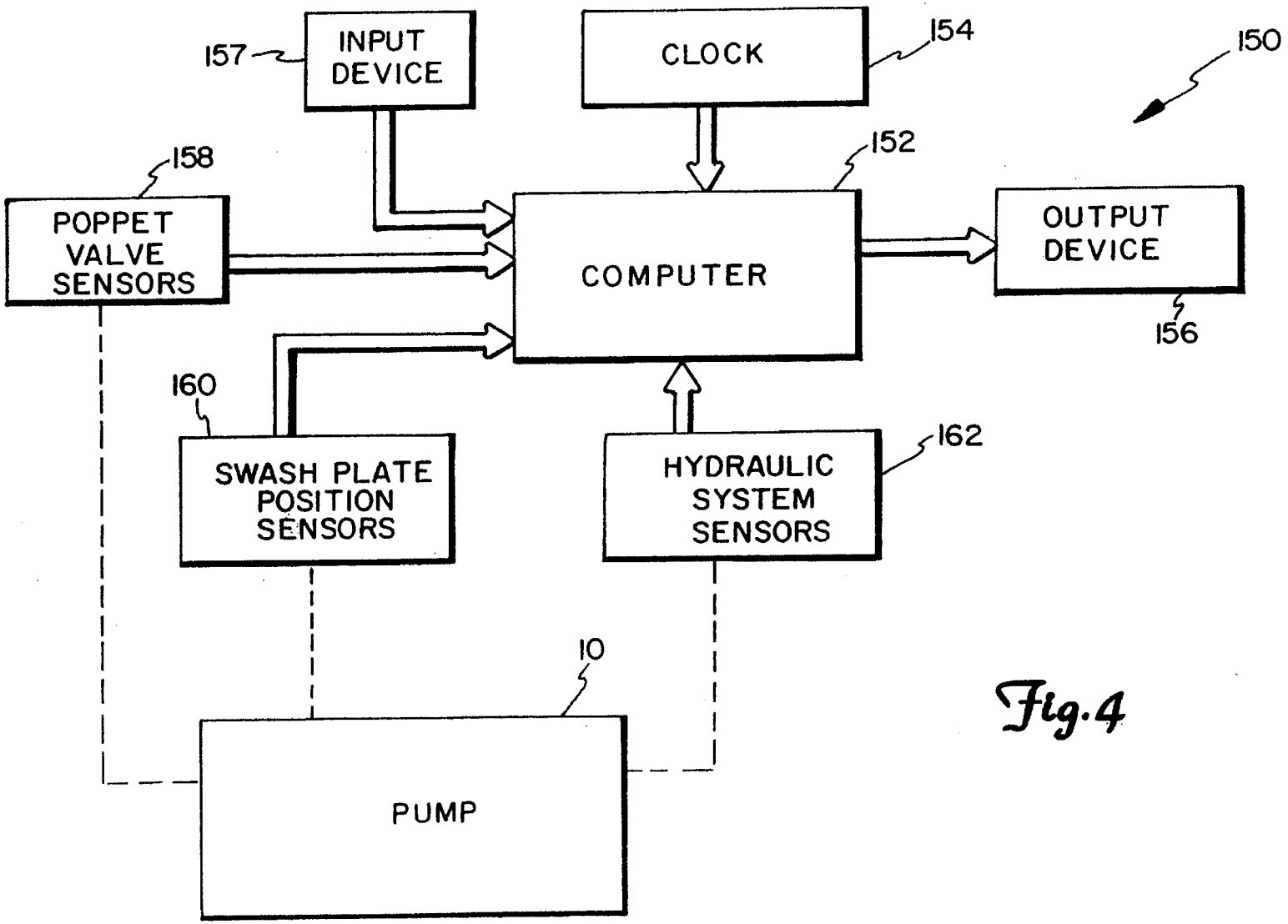
FIGS. 4–7 are block diagrams of alternative monitoring systems for determining instantaneous and accumulated volumes of sludge materials pumped by a positive displacement pump.

FIG. 4 shows a first embodiment of the present invention, in which operation of pump 10 is monitored by system 150 to provide an accurate measurement of volume pumped on a cycle-by-cycle basis, and on an accumulated basis. Monitor system 150 includes digital computer 152, which in a preferred embodiment is a microprocessor based computer including associated memory and input/output circuitry, clock 154, output device 156, input device 157, poppet valve sensors 158, swash plate position sensors 160, and hydraulic system sensors 162.

Clock 154 provides a time base for computer 152. Although shown separately in FIG. 4, clock 154 is, in preferred embodiments of the present invention, contained as a part of digital computer 152.

Output device 156 takes the form, for example, of a cathode ray tube or liquid crystal display, a printer, or communication devices which transmit the output of computer 152 to another computer based system (which may, for example, be monitoring the overall operation of the entire facility where sludge pump 10 is being used).

Sensors 158, 160 and 162 monitor the operation of pump 10 and provide signals to computer 152. The parameters sensed by sensors 158, 160, 162, provide an indication of the percent fill of the cylinder during each pumping stroke of pump 10, and allow computer 152 to determine the time period of the cycle. From this information, computer 152 determines the volume of material pumped during that particular cycle, the accumulated volume, the pumping rate during that cycle, and an average pumping rate over a selected period of time. Computer 152 stores the data in memory, and also provides signals to output device 156 based upon the particular information selected by input device 157.

In one preferred embodiment of the present invention, the determination of volume pumped during a pumping cycle is as follows. Hydraulic system sensors 162 provide an indication to computer 152 of the start of each pumping stroke in pump 10. Sensors 162 also provide an indication of the time at which the pumping stroke ends. These signals are supplied to computer 152 by sensors 162 preferably in the form of interrupt signals.

Poppet valve sensors 158 sense when the outlet poppet valve opens during the pumping stroke. The signal from poppet valve sensors 158 is also preferably in the form of an interrupt signal to computer 152.

Swash plate position sensors 160 sense the flow rate of hydraulic fluid from hydraulic pump 52. The swash plate position determines the flow rate, and the output of position sensors 162 is preferably in the form of a digital signal to computer 152 which can be converted to a flow rate.

Based upon the signals from sensors 158, 160 and 162, computer 150 knows the beginning of each pumping stroke, the point in time when the outlet poppet valve opens, and the end of the pumping stroke. By using the clock signals from clock 154, computer 152 is able to determine times T2 and T3. As long as the pumping rate is not changed by the operator in the middle of a pumping cycle, the ratio of T3/(T2+T3) will provide an accurate representation of the percentage fill during the pumping cycle. Swash plate position sensors 160 are intended to indicate to computer 152 that the velocity has indeed remained essentially constant through the cycle. Otherwise, adjustments must be made, because the ratio to determine percentage fill is actually the ratio of the length of stroke with the material fully compressed to the total length of stroke. The use of times T2 and T3 instead of distance of travel of the piston is based on the assumption that the piston is moving at an essentially constant rate.

In a preferred embodiment of the present invention, computer 152 calculates, for each stroke, the percentage fill. Knowing the total displacement volume of the cylinder, computer 152 calculates the actual volume pumped during each cycle. That value is stored in a register within the memory of computer 152. In additional, computer 152 updates a register which keeps an accumulated total of volume pumped.

Because computer 152 also determines the length of time during each cycle and the accumulated time over which the accumulated volume has been pumped, it is possible to calculate an instantaneous pumping rate for each cycle, as well as an average pumping rate over the accumulated time.

All four values (volume pumped in a particular cycle, total accumulated volume, instantaneous pumping rate, and average pumping rate) can be displayed by output device 156. Typically, the operator will select the particular information to be displayed by providing a command through input device 157 to computer 152.

Figure 5:
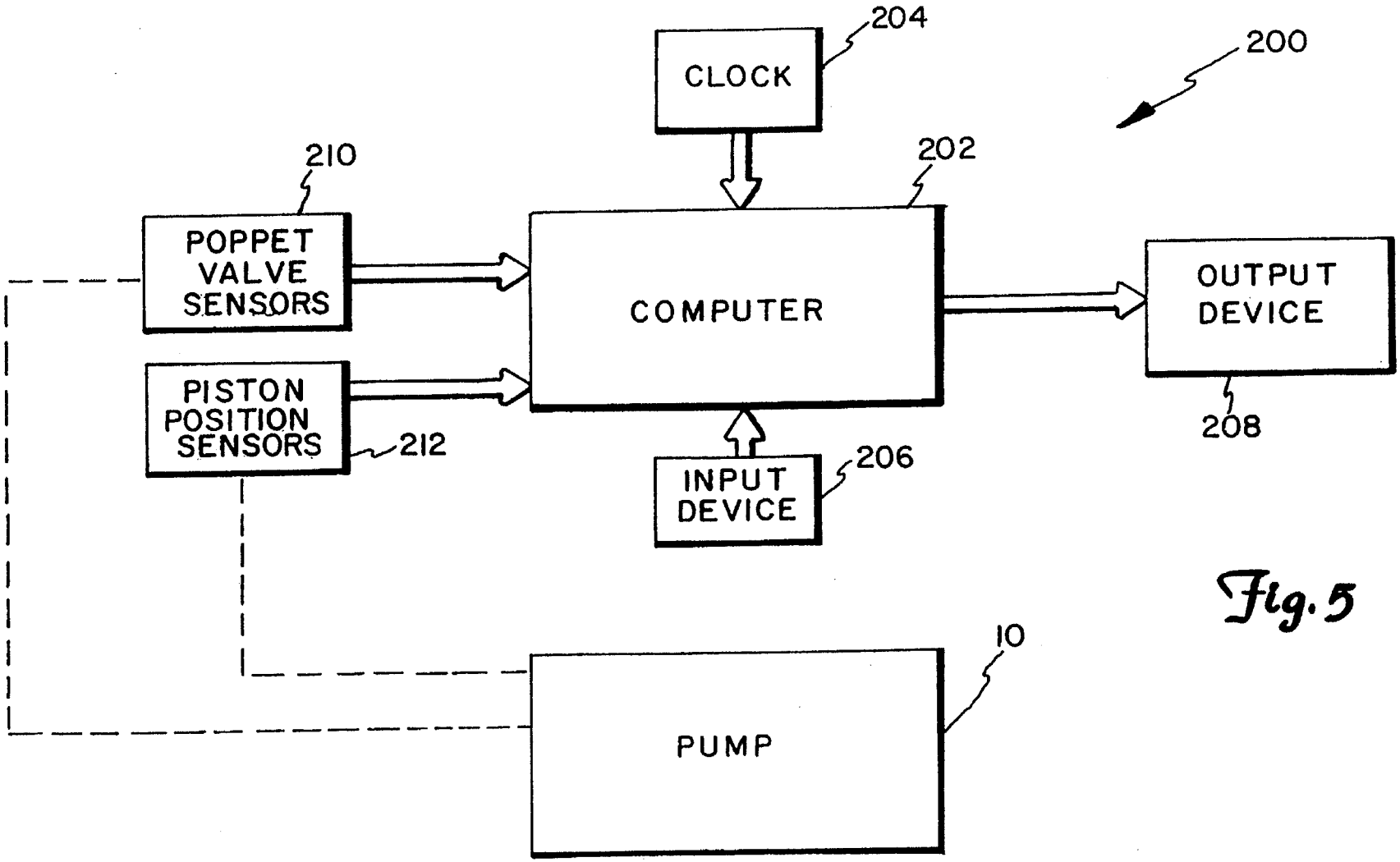

FIG. 5 shows another embodiment of the present invention in which monitoring system 200 monitors the operation of pump 10. In this embodiment, monitoring system 200 includes computer 202, clock 204, input device 206, output device 208, poppet valve sensors 210, and piston position sensors 212.

In the embodiment shown in FIG. 5, the piston position sensors 212 sense the position of each of the pistons of pump 10 during the pumping strokes. From the signals supplied by the piston position sensors, the starting and stopping points of each pump stroke are known. The signals from the piston position sensors are, in a preferred embodiment, a digital value. For example, piston position sensors 212 are preferably a linear displacement sensors (which may be analog sensors) together with an analog-to-digital converter so that the data supplied to computer 202 is in digital form.

When the poppet valve opens, as indicated by poppet valve sensors 212, the value being read by piston position sensors 212 is supplied to computer 202. The distance from the start of the pumping stroke to the opening of the valve is distance L1, and the distance from the opening of the poppet valve to the end of the stroke is distance L2. The percent fill, in that case, is L2/(L1+L2).

Clock 204 provides a time base to computer 202 so that the instantaneous and average pumping rate values can be calculated. As in system 150 shown in FIG. 4, in system 200 the volume pump during a particular pumping cycle, accumulated volume pump, instantaneous pumping rate, and average pumping rate are calculated by computer 202 and stored in appropriate registers of its memory. Upon commands supplied by input device 206 to computer 202, any or all of these calculated values are displayed by output device 208. Alternatively, output device 208 can be a transmitter which sends the information to another computer of another system which is monitoring the operation of a facility in which pump 10 is being used.

Figure 6:
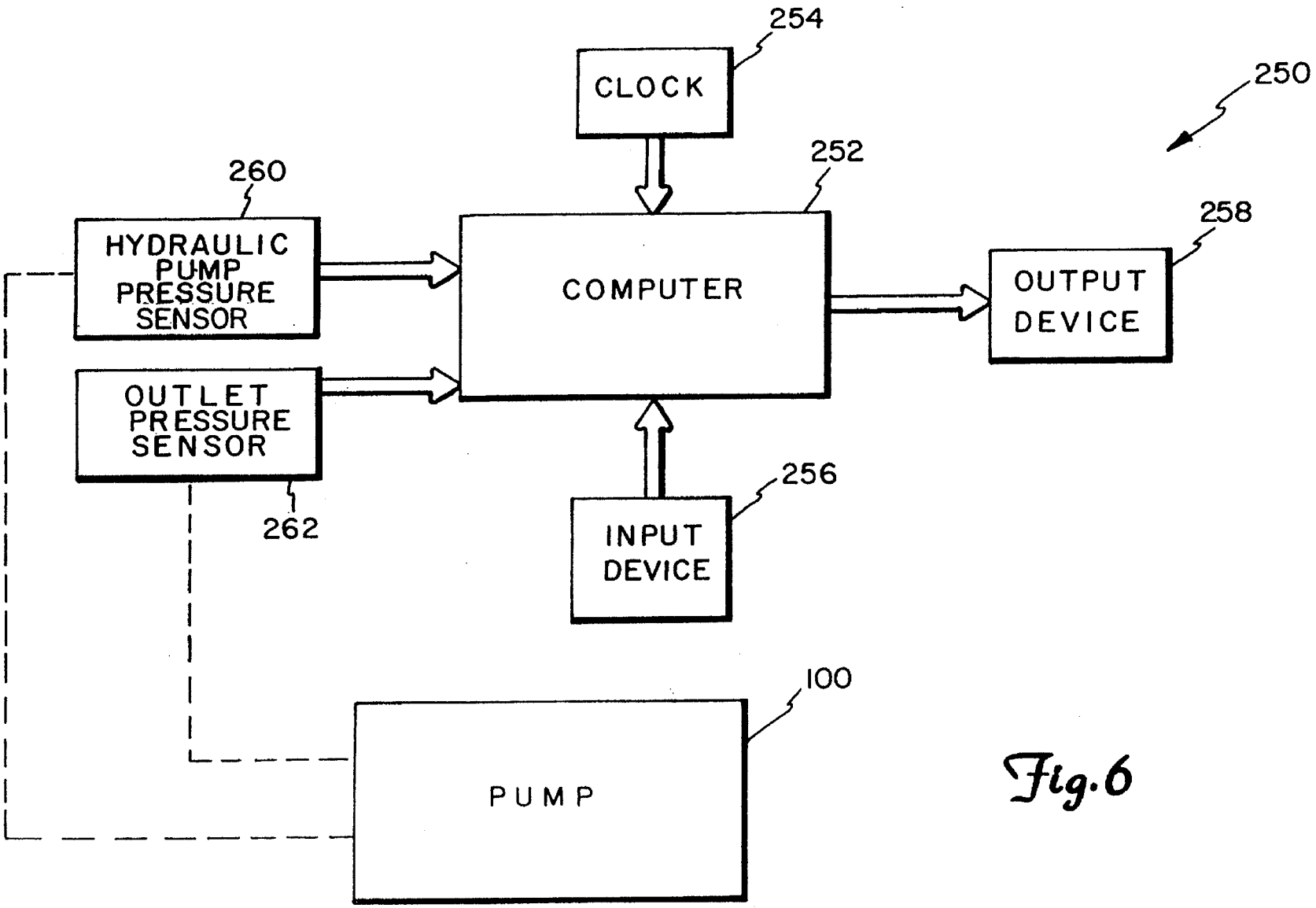

FIG. 6 shows a monitoring system 250 which is used to monitor pump 100 (shown in FIG. 2). Because there are no poppet valve openings in which to indicate the point at which pressure within the material cylinder equals the outlet pressure in pump 100, the same information must be obtained by sensing different parameters.

Monitoring system 250 includes computer 252, clock 254, input device 256, output device 258, hydraulic pump pressure sensor 260, and outlet pressure sensor 262. Outlet pressure sensor 262 is an analog pressure sensor, a digital pressure sensor, or a poppet valve located downstream of the pump with an associated valve position sensor. Computer 252 receives signals from pressure sensors 260 and 262. When the sensed hydraulic pump pressure on the high pressure side and/or the outlet pressure (which is sensed at outlet 124 or at a point downstream from outlet 124) begins to rise, computer 252 notes the time during the pumping cycle. Computer 252 determines, at the end of the pumping cycle, the ratio or percentage fill by dividing T3 by the sum of T2+T3.

As in the embodiment of FIG. 4, monitoring system 250 assumes that the piston is moving at a constant velocity during the pumping stroke. For further accuracy, swash plate position sensors similar to sensors 160 of FIG. 4 can be added to system 250.

As with the embodiments shown in FIGS. 4 and 5, system 250 calculates and stores volume during each cycle, accumulated volume, instantaneous pumping rate, and average pumping rate. That information is displayed by output device 258 upon command from input device 256.

Figure 7:
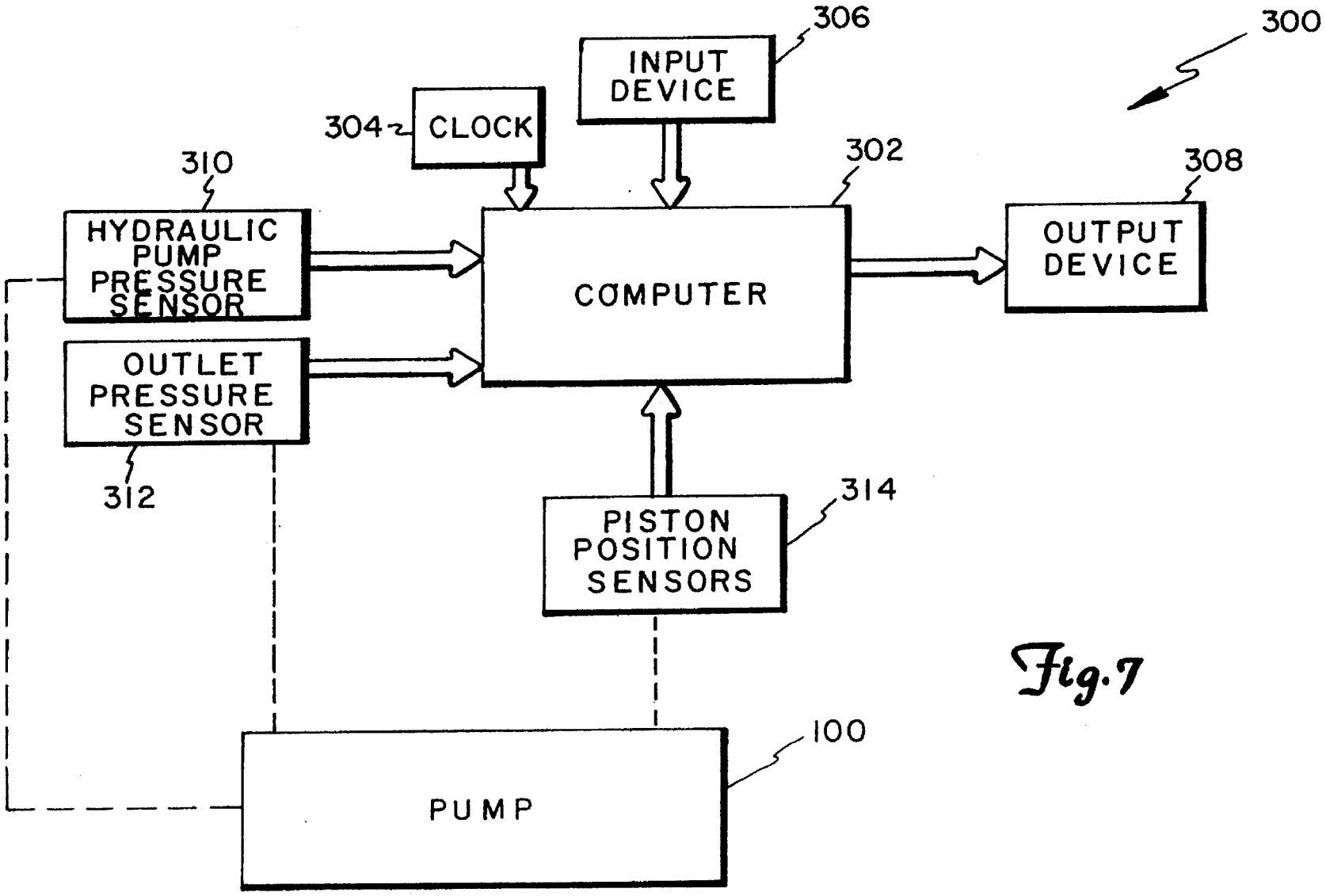

FIG. 7 shows monitoring system 300 which monitors the operation of pump 100. System 300 includes computer 302, clock 304, input device 306, output device 308, hydraulic pump pressure sensor 310, outlet pressure sensor 312, and piston position sensors 314. In this embodiment, computer 302 reads the position of the piston at the beginning of each pumping cycle, at the end of each pumping cycle, and at the point and time in which a hydraulic pump pressure from sensor 310 exceeds or equals the outlet pressure sensed by outlet pressure sensor 312. System 300 calculates and stores the same information which has been described with regard to systems 150, 200 and 250 in FIGS. 4–6.

Still other embodiments of the present invention are possible. For example, by sensing hydraulic pump pressure, and determining the change of slope of the pressure curve shown in FIG. 3, it is possible to determine the point within the cycle at which the pressure within the cylinder equals or exceeds the outlet pressure. By continually monitoring the hydraulic pump pressure and performing a slope analysis, an outlet pressure sensor (such as pressure sensor 312 shown in FIG. 7) is not necessary in some embodiments.

As another example, monitoring outlet pressure and analyzing the outlet pressure curve in the computer provides another way to determine when material begins to flow during each pumping stroke. In this embodiment, sensing hydraulic pressure may not be necessary.

In conclusion, the present invention provides accurate volume and pumping rate measurement of a sludge pump. The present invention recognizes that in a positive displacement sludge pump, the filling percentage of the pumping cylinder can change from cycle to cycle. By monitoring the percentage fill on a cycle-by-cycle basis, highly accurate automated measurement of material delivered during each cycle, accumulated volume delivered, instantaneous pumping rate, and average pumping rate can be provided.

Although the present invention has been described with reference to preferred embodiments, workers skilled in the art will recognize that changes may be made in form and detail without departing from the spirit and scope of the invention.

What is claimed is:

1. A pump system for pumping a sludge material, the pump system comprising:

a positive displacement pump which includes:

an inlet for receiving sludge material which contains solids, liquids, and gases and which is partially compressible;

an outlet at which sludge material is delivered under pressure;

a first cylinder;

a first piston movable in the first cylinder;

first hydraulic drive means for moving the first piston reciprocatively through a cycle which includes a pumping stroke and a filling stroke; and first valve means for connecting the first cylinder to the outlet during the pumping stroke and connecting the first cylinder to the inlet during the filling stroke;

means for providing a first signal which indicates when sludge material begins to flow from the first cylinder at a time following the beginning of piston movement during the pumping stroke; and means for determining volume of sludge material delivered at the outlet during the pumping stroke based upon the first signal.

2. The pump system of claim 1 wherein the means for determining comprises:

means for measuring time intervals from start of the pumping stroke to occurrence of the first signal and from occurrence of the first signal to end of the pumping stroke; and means for calculating volume based upon the time intervals.

3. The pump system of claim [and] *1* further comprising[:]

means for sensing position of the first piston in the first cylinder; and wherein the means for determining calculates the volume based upon the sensed position of the first piston when the first signal occurs.

4. The pump system of claim 1 wherein the first valve means is of a type which connects the first cylinder to the outlet only when pressure within the first cylinder essentially equals pressure at the outlet, and wherein the means for providing a first signal senses when the first valve means connect the first cylinder to the outlet.

5. The pump system of claim 4 wherein the first valve means includes:

an inlet poppet valve connected between the inlet and the first cylinder; and an outlet poppet valve connected between the outlet and the first cylinder.

6. The pump system of claim 5 wherein the first valve means further includes:

valve control means for controlling operation of the inlet and outlet poppet valves to cause both the inlet and outlet poppet valves to be closed at the beginning of each stroke.

7. The pump system of claim *1* wherein the positive displacement pump further includes:

a second cylinder;

a second piston movable in the second cylinder;

second hydraulic drive means for moving the second piston reciprocatively through a cycle which includes a pumping stroke and a filling stroke; and second valve means for connecting the second cylinder to the outlet during the pumping stroke and connecting the second cylinder to the inlet during the filling stroke.

8. The pump system of claim 7 wherein the means for providing a first signal also provides the first signal to indicate when sludge material begins to flow from the second cylinder during the pumping stroke.

9. The pump system of claim 1 and further comprising:

means for measuring time during pumping strokes; and means for determining a volume flow rate as a function of the volume of sludge material delivered at the outlet during a pumping stroke and the measured time.

10. The pump system of claim 1 and further comprising:

means for determining a total accumulated volume based upon the volumes determined during a plurality of pumping strokes.

11. A pump system of claim 10 and further comprising:

means for measuring time during the plurality of pumping strokes; and means for determining an average pumping rate as a function of the total accumulated volume and the measured time.

12. A pump system for pumping a material, the pump system comprising:

a positive displacement pump which includes:

an inlet;

an outlet;

a first cylinder;

a first piston movable in the first cylinder;

first hydraulic drive means for moving the first piston reciprocatively through a cycle which includes a pumping stroke and a filling stroke; and first valve means for connecting the first cylinder to the outlet during the pumping stroke and connecting the first cylinder to the inlet during the filling stroke;

means for providing a first signal which indicates when material begins to flow from the first cylinder at a time following the beginning of piston movement during the pumping stroke, the means for providing a first signal comprising:

means for sensing hydraulic fluid pressure;

means for sensing pressure of the material at the outlet; and means for producing the first signal when the hydraulic fluid pressure sensed and the pressure of the material sensed have a predetermined relationship; and means for determining volume of material delivered during the pumping stroke based upon the first signal.

13. A pump system for pumping a material, the pump system comprising:

a positive displacement pump which includes:

an inlet;

an outlet;

a first cylinder;

a first piston movable in the first cylinder;

first hydraulic drive means for moving the first piston reciprocatively through a cycle which includes a pumping stroke and a filling stroke; and first valve means for connecting the first cylinder to the outlet during the pumping stroke and connecting the first cylinder to the inlet during the filling stroke;

means for providing a first signal which indicates when material begins to flow from the first cylinder at a time following the beginning of piston movement during the pumping stroke;

means for determining volume of material delivered at the outlet during the pumping stroke based upon the first signal; and means for sensing hydraulic fluid flow rate in the first hydraulic drive means;

wherein the means for determining volume further bases the volume on sensed hydraulic fluid flow rate.

14. A pump system for pumping a sludge material, the pump system comprising:

a positive displacement pump which includes:

an inlet for receiving sludge material which contains solids, liquids, and gases and which is partially compressible;

an outlet at which sludge material is delivered under pressure;

a cylinder;

a piston movable in the cylinder;

hydraulic drive means for moving the piston reciprocatively through a cycle which includes a pumping stroke and a filling stroke; and valve means for connecting the cylinder to the outlet during the pumping stroke and connecting the cylinder to the inlet during the filling stroke;

means for sensing a parameter related to operation of the pump and which is related to a fill percentage of sludge material in the cylinder during each pumping stroke; and means for providing a signal representative of volume of sludge material delivered at the outlet during each pumping stroke based upon the sensed parameter.

15. A pump system for pumping a material, the pump system comprising:

a positive displacement pump which includes:

an inlet;

an outlet;

a cylinder;

a piston movable in the cylinder;

hydraulic drive means for moving the piston reciprocatively through a cycle which includes a pumping stroke and a filling stroke; and valve means for connecting the cylinder to the outlet during the pumping stroke only when pressure within the cylinder exceeds pressure at the outlet, and for connecting the cylinder to the inlet during the filling stroke;

means for sensing when the valve means connects the cylinder to the outlet; and means for providing a signal representative of volume of material delivered at the outlet during each pumping stroke based upon the sensed time when the valve means connects the cylinder to the outlet.

16. A method of determining volume of sludge material delivered by a positive displacement piston/cylinder pump, the method comprising:

sensing a fill percentage of the cylinder based upon when sludge material, which contains solids, liquids, and gases and which is partially compressible, begins to flow out of the cylinder during each pumping stroke of the pump after piston movement begins; and determining actual volume delivered during each pumping stroke based on the fill percentage of the cylinder when sludge material begins to flow out of the cylinder after piston movement begins.

17. A pump system for pumping a sludge material, the pump system comprising:

a positive displacement pump which includes:

an inlet for receiving sludge material which contains solids, liquids, and gases and which is partially compressible;

an outlet at which sludge material is delivered under pressure;

a cylinder;

a piston movable in the cylinder;

hydraulic means for moving the piston reciprocatively through a cycle which includes a pumping stroke and a filling stroke; and valve means for connecting the cylinder to the outlet during the pumping stroke when pressure within the cylinder essentially equals the pressure at the outlet;

means for providing a signal which indicates when the valve means connects the cylinder to the outlet; and means for determining volume of sludge material delivered at the outlet during the pumping stroke based upon the signal.

18. The pump system of claim 17 wherein the valve means includes:

an inlet poppet valve connected between the inlet and the cylinder; and an outlet poppet valve connected between the outlet and the cylinder.

19. The pump system of claim 18 wherein the valve means further includes:

valve control means for controlling operation of the inlet and outlet poppet valves to cause both the inlet and outlet poppet values to be closed at the beginning of each stroke.

20. A pump system for pumping a material, the pump system comprising:

a positive displacement pump which includes:

an inlet;

an outlet;

a first cylinder;

a first piston movable in the first cylinder;

first hydraulic drive means for moving the first piston reciprocatively through a cycle which includes a pumping stroke and a filling stroke; and first valve means for connecting the first cylinder to the outlet during the pumping stroke and connecting the first cylinder to the inlet during the filling stroke;

means for sensing hydraulic fluid pressure;

means for producing a first signal when the hydraulic fluid pressure sensed and the pressure of the material sensed have a predetermined relationship; and means for determining volume of viscous material delivered at the outlet during the pumping stroke based upon the first signal.

21. The pump system of claim 20 wherein the positive displacement pump further includes:

a second cylinder;

a second piston movable in the second cylinder;

second hydraulic drive means for moving the second piston reciprocatively through a cycle which includes a pumping stroke and a filling stroke; and second valve means for connecting the second cylinder to the outlet during the pumping stroke and connecting the second cylinder to the inlet during the filling stroke.

22. A pump system for pumping a material, the pump system comprising:

a positive displacement pump which includes:

an inlet;

an outlet;

a first cylinder;

a first piston movable in the first cylinder;

first hydraulic drive [mans] *means* for moving the first piston reciprocatively through a cycle which includes a pumping stroke and a filling stroke; and first valve means for connecting the first cylinder to the outlet during the pumping stroke and connecting the first cylinder to the inlet during the filling stroke;

means for sensing hydraulic fluid flow rate in the first hydraulic drive means; and means for determining volume of viscous material delivered at the outlet during the pumping stroke based on sensed hydraulic fluid flow rate.

23. The pump system of claim 22 and further comprising:

means for determining a total accumulated volume based upon the volume determined during a plurality of pumping strokes.

24. The pump system of claim 23 and further comprising:

means for measuring time during the plurality of pumping strokes; and means for determining an average pumping rate as a function of the total accumulated volume in the measured time.

25. The pump system of claim 22 and further comprising:

means for measuring time during pumping strokes; and means for determining a volume flow rate as a function of the volume of viscous material delivered at the outlet during a pumping stroke in the measured time.

26. A method of determining a volume of a sludge material delivered by a positive displacement piston/cylinder pump, the method comprising:

sensing when, during each pumping stroke of the pump, the sludge material, which contains solids, liquids, and gases and which is partially compressible, begins to flow out of the cylinder during each pumping stroke of the pump after piston movement begins; and determining actual volume delivered during each pumping stroke based on when during the pumping stroke sludge material begins to flow out of the cylinder after piston movement begins.

27. A method of determining volume of sludge material delivered by a positive displacement piston/cylinder pump, the method comprising:

sensing hydraulic fluid pressure;

sensing the pressure of the sludge material, which contains solids, liquids, and gases and which is partially compressible;

producing a signal when the sensed hydraulic fluid pressure and the sensed sludge material pressure have a predetermined relationship; and determining the volume of sludge material delivered during the pumping stroke based upon the signal.

28. A method of determining volume of compressible material delivered by a positive displacement piston/cylinder pump, the method comprising;

sensing hydraulic fluid flow rate in a hydraulic drive means; and determining the volume of compressible material delivered during the pumping stroke based on the sensed hydraulic fluid flow rate.

29. A method of determining volume of sludge material delivered by positive displacement system/cylinder pump, the method comprising:

measuring time intervals from start of the pumping stroke to a moment when sludge material, which contains solids, liquids, and gases and which is partially compressible, begins to flow from the cylinder at a time following the beginning of the piston movement during the pumping stroke;

measuring time intervals from a moment when sludge material begins to flow from the cylinder at a time following the beginning of the piston movement during the pumping stroke to the end of the pumping stroke; and calculating volume based upon the measured time intervals.

30. The method of claim 29 and further comprising:

determining a total accumulated volume based upon the volumes determined during a plurality of pumping strokes.

31. The method of claim 30 and further comprising:

measuring time during the plurality of pumping strokes; and determining an average pumping rate as a function of the total accumulated volume and the measured time.

32. A pump system for pumping a sludge material, the pump system comprising:

a positive displacement pump which includes:

an inlet for receiving sludge material which contains solids, liquids, and gases and which is partially compressible;

an outlet at which sludge material is delivered under pressure;

a cylinder;

a piston movable in the cylinder;

hydraulic drive means for moving the piston reciprocatively through a cycle which includes a pumping stroke and a filling stroke; and valve means for connecting the cylinder to the outlet during the pumping stroke and connecting the cylinder to the inlet during the filling stroke;

means for providing a signal which indicates when sludge material begins to flow from the cylinder at a time following the beginning of the piston movement during the pumping stroke;

means for measuring time intervals from start of the pumping stroke to occurrence of the signal and from occurrence of the signal to end of the pumping stroke; and means for calculating volume of sludge material delivered during the pumping stroke based upon the time intervals.

33. A pump system for pumping sludge material, the pump system comprising:

a positive displacement pump which includes:

an inlet for receiving sludge material which contains solids, liquids, and gases and which is partially compressible such that a reduction in volume of sludge material occurs when sludge material is placed under pressure in the pump system;

an outlet at which sludge material is delivered under pressure;

a cylinder;

a piston movable in the cylinder;

hydraulic drive means for moving the piston reciprocatively through a cycle which includes a pumping stroke and a filling stroke; and valve means for connecting the cylinder to the outlet during the pumping stroke and connecting the cylinder to the inlet during the filling stroke;

means for providing a signal which indicates when sludge material begins to flow from the cylinder at a time following the beginning of the piston movement during the pumping stroke; and means for determining volume of sludge delivered at the outlet during the pumping stroke based upon the signal.

34. A method of determining volume of sludge material delivered by a positive displacement piston/cylinder pump having an inlet and an outlet, the sludge material received at the inlet being partially compressible such that a reduction in volume of the sludge material occurs during each pumping stroke, the method comprising:

sensing when during each pumping stroke of the pump, the sludge material begins to flow out of the cylinder during each pumping stroke from the pump after piston movement begins; and determining actual volume delivered during each pumping stroke based on when, during the pumping stroke, sludge begins to flow out of the cylinder after piston movement begins.

* * * * *

UNITED STATES PATENT AND TRADEMARK OFFICE

CERTIFICATE OF CORRECTION

PATENT NO. : RE. 35,473

DATED : MARCH 11, 1997

INVENTOR(S) : EDWARD A. OAKLEY, HARRY K. CROW, THOMAS M. ANDERSON, RICHARD T. ATHERTON, BERTHOD A. FEHN

It is certified that error appears in the above-indentified patent and that said Letters Patent is hereby corrected as shown below:

On the title page [75] under "Inventors:", after "Thomas M. Anderson", delete "Forest Lake", insert --Hugo--

Signed and Sealed this

Ninth Day of September, 1997

*Attest:*

*Attesting Officer*

BRUCE LEHMAN

*Commissioner of Patents and Trademarks*